March 3, 1953     L. B. PIERCE     2,630,219
FILE FOR PHOTOGRAPHIC SLIDES
Filed June 17, 1950
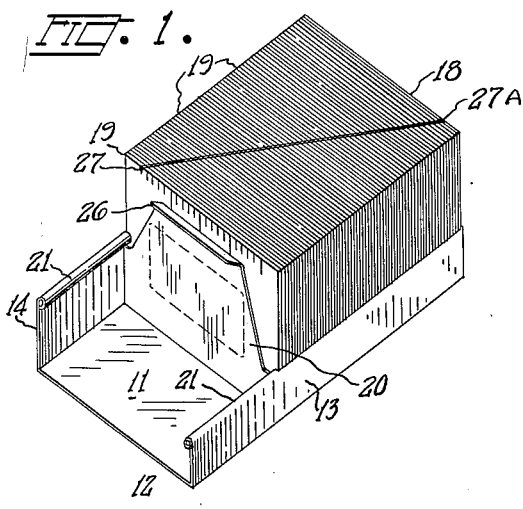
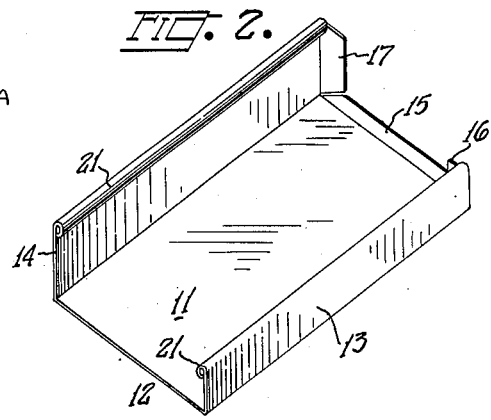
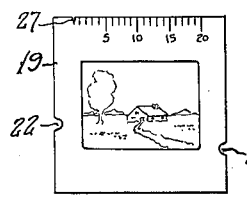
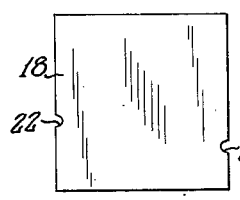
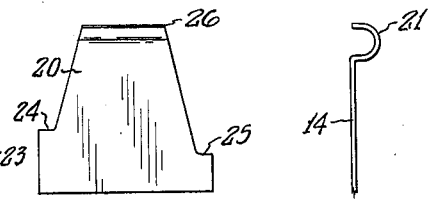
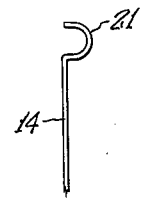
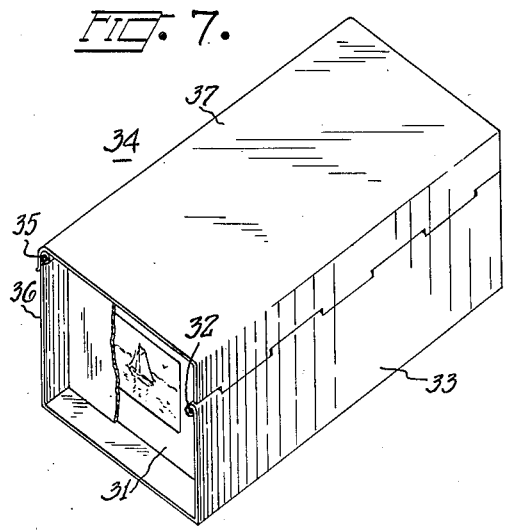
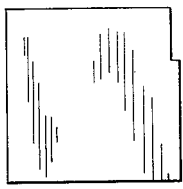
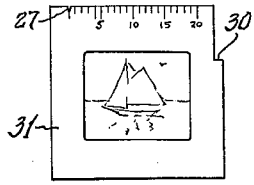
INVENTOR
LOUIS B. PIERCE
BY
ATTORNEY Patented Mar. 3, 1953

2,630,219

UNITED STATES PATENT OFFICE 2,630,219

FILE FOR PHOTOGRAPHIC SLIDES

Louis B. Pierce, Medford, Oreg.

Application June 17, 1950, Serial No. 168,800

1 Claim. (Cl. 206—74)

This invention relates generally to means for filing photographic slides. More particularly, this invention relates to a means for filing photographic slides so that they must each necessarily be filed with the same face forward and the same edge upward.

It is a principal object of this invention to provide a photographic slide and a tray therefor wherein the slide and tray have cooperating means to assure the proper placement of the slide in the tray.

It is a second object of this invention to provide means for assurance that each slide taken from the tray will be in its proper position for placing in an optical projector therefor.

It is a third object of this invention to attain the above objects in a simple and inexpensive way.

It is a fourth object of this invention to combine with the other advantages of the invention a means for assurance that the slides will be placed in the tray in consecutive order.

How these and other objects are attained will be apparent on reference to the following description and the accompanying drawing, in which:

Fig. 1 shows a file of slides of this invention properly placed in a tray of this invention.

Fig. 2 is a perspective view of the tray of Fig. 1.

Fig. 3 is a front view of one of the slides of Fig. 1.

Fig. 4 is a front view of a blank or spacer used to end or divide a given group of slides when filed as in Fig. 1.

Fig. 5 is a front view of the adjustably positionable slide retainer shown in place in Fig. 1.

Fig. 6 is an alternate form of the vertical section of the left hand side of the tray of Fig. 1 or Fig. 2.

Fig. 7 is a perspective view of another means for practicing the teaching of this invention.

Fig. 8 is a front view of a blank or spacer used in the form of the invention shown in Fig. 7.

Fig. 9 is a front view of a slide adapted to be used in the form of the invention shown in Fig. 7.

Referring now to the drawing, there is shown a filing tray 11 having a flat rectangular bottom 12, sides 13 and 14, each of unequal height raised at opposite edges from the bottom 11 and at right angles thereto, and a partial back end closure formed by bending inwardly the rear extensions 15, 16 and 17 of bottom 12 and sides 13 and 14 respectively. In Fig. 1, tray 11 is shown with spacer 18 resting against the partial back end of the tray, followed forwardly by a stack of slides 19, which in turn are held in place by the slide retainer 20.

Formed along the upper edges of sides 13 and 14 of tray 11 are inwardly projecting ribs 21 which may be of any desired cross section outline. In Figs. 1 and 2, ribs 21 are shown as formed with a closed roll, while in Fig. 6, rib 21 is shown as formed with an open roll. Spacer 18 and slides 19 are shown notched as at 22 and 23 to clear ribs 21 when placed in the tray. Retainer 20 is shown with its top corners cut away and with horizontal side edges 24 and 25 formed to make a tight fit between the top of bottom 12 and the undersides of ribs 21 on sides 14 and 13 respectively. Also retainer 20 has its top edge curled back as at 26 for ease of manual manipulation.

It should be particularly noted that notches 22 and 23 and their respective mating ribs 21 are neither located symmetrically with respect to a vertical nor a horizontal median line on the face of slide 19 as it stands in tray 11. Because of this asymmetry, it is impossible to put the slide 19 in tray 11 either upside down or wrong side forward.

Each of the slides 19 have printed along their front top edges a series of uniformly spaced positions consecutively numbered for the purpose of consecutive identification by a notch which can be cut into the top edge of the individual slide after a desired consecutive order has been established for a group of slides. When the slides have been notched at the numbered locations conforming with their desired consecutive position in the group and the slides consecutively stacked in the tray, it will be seen that the consecutive notches will form a diagonal groove across the top of the file of slides as shown at 27—27A in Fig. 1. This arrangement has been found to be most convenient for either visually or by feel assuring the proper sequence of slide exposure and is a valuable part of this invention.

In Figs. 7, 8 and 9 is shown a modified form of this invention in which only a single notch 30 asymmetrically formed in slide 31 is required. In this case a single rolled rib 32 on side 33 of tray 34 is required. Rolled edge 35 shown on side 36 of tray 34 is optional and for stiffness only and, if used, side 36 must be high enough for edge 35 to clear the upper edge of slide 31. In the form shown, rolled rib 32 is shown as made in the form of a hinge member attaching top 37 to tray 34.

Having thus described the structure of my invention and explained its use, I claim:

A file for photographic slides comprising in combination a channel having side walls unequal in height with inturned ribs formed along the top edges of the side walls, one end of said channel being open, the other end having inturned flanges formed thereon, spacers having lateral notches engaging said ribs, a slide retainer fitting slidably into said channel and having shoulders formed in the lateral edges of the retainer engaging the under sides of said ribs, said retainer extending to the bottom of the said channel, and a plurality of slides having notches in the side edges thereof engaging said ribs and all of said slides having a diagonal groove formed across the top edges thereof.

LOUIS B. PIERCE.

REFERENCES CITED

The following references are of record in the file of this patent:

UNITED STATES PATENTS

| Number | Name | Date |
| --- | --- | --- |
| 465,465 | Doan | Dec. 22, 1891 |
| 724,173 | Evans | Mar. 31, 1903 |
| 1,317,392 | Ringler | Sept. 30, 1919 |
| 1,332,954 | Ringler | Mar. 9, 1920 |
| 1,439,820 | Innes | Dec. 26, 1922 |
| 2,165,790 | Engel | July 11, 1939 |

FOREIGN PATENTS

| Number | Country | Date |
| --- | --- | --- |
| 396,239 | Great Britain | Aug. 3, 1933 |